United States Patent [19]

Aldrich et al.

[11] Patent Number: 4,592,988

[45] Date of Patent: Jun. 3, 1986

[54] FERRITE TONER CARRIER CORE COMPOSITION DERIVED FROM FLY ASH

[75] Inventors: Robert G. Aldrich, Manlius; Geoffrey H. Earl, Erieville; David W. Trunko, Lafayette, all of N.Y.

[73] Assignee: Halomet, Inc., Syracuse, N.Y.

[21] Appl. No.: 640,813

[22] Filed: Aug. 15, 1984

[51] Int. Cl.$^4$ .............. G03G 9/00; G03G 9/14; G03G 9/10; C01G 49/08

[52] U.S. Cl. .............. 430/107; 252/62.55; 252/62.56; 252/62.58; 252/62.59; 252/62.6; 252/62.62; 252/62.63; 252/62.64; 430/106.6; 430/108; 430/965

[58] Field of Search .......... 430/108, 107, 106.6, 430/965; 252/62.55, 62.56, 62.58, 62.59, 62.6, 62.62, 62.63, 62.64; 106/DIG. 1

[56] References Cited

U.S. PATENT DOCUMENTS

| | | | |
|---|---|---|---|
| Re. 31,540 | 3/1984 | Aldrich | 106/DIG. 1 X |
| 2,856,365 | 10/1958 | Heck et al. | 252/62.56 |
| 2,886,529 | 3/1959 | Guillaud | 252/62.56 |
| 2,927,896 | 3/1960 | Bergmann | 252/62.56 |
| 3,565,805 | 8/1963 | Jones et al. | 430/108 |
| 3,795,618 | 3/1972 | Kasper | 430/110 X |
| 4,076,640 | 2/1978 | Forgensi et al. | 427/127 X |
| 4,268,320 | 5/1981 | Klingaman et al. | 106/DIG. 1 X |
| 4,319,988 | 3/1982 | Aldrich | 252/60 X |
| 4,485,162 | 11/1984 | Imamura et al. | 430/106.6 |

FOREIGN PATENT DOCUMENTS

| | | | |
|---|---|---|---|
| 0125751 | 10/1981 | Japan | 430/108 |
| 0177162 | 10/1982 | Japan | 430/108 |
| 0177160 | 10/1982 | Japan | 430/108 |
| 0123550 | 7/1983 | Japan | 430/106.6 |
| 0123549 | 7/1983 | Japan | 430/106.6 |
| 0123548 | 7/1983 | Japan | 430/106.6 |

OTHER PUBLICATIONS

Studies of the Constitution of Fly Ash Using Selective Dissolution, U.S. Army Eng. Waterways Experiment Station Report, May 1983, Prep. by Bettelle Memorial Inst., Columbus, Ohio.

Primary Examiner—John E. Kittle
Assistant Examiner—Mukund J. Shah
Attorney, Agent, or Firm—Bert J. Lewen; Henry Sternberg

[57] ABSTRACT

A ferrite toner carrier core composition derived from flyash comprising a mixture of spherical particulates of the general formula

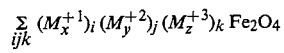

wherein iron is the principal metallic element and i,j,k denote the number of atoms of monovalent, divalent and trivalent atoms present in one mole of the compound, and $M_x$ denotes monovalent atoms from Group IA of the Periodic Table, the alkali metals, usually sodium or potassium, alone or together.

$M_y$ denotes divalent atoms from Group IIA of the Periodic Table, the alkali earth metals, usually magnesium or calcium, alone or together.

$M_z$ denotes trivalent atoms from Group IVB, usually titanium, Group IVA, usually silicon and Group IIIA, usually aluminum. All permutations and combinations may be present.

12 Claims, 3 Drawing Figures

FERRITE TONER CARRIER CORE COMPOSITION DERIVED FROM FLY ASH

BACKGROUND OF THE INVENTION

This invention relates to electrostatographic imaging systems and more specifically to an improved ferrite toner carrier core composition which may be made from fly ash derived magnetite.

The development of electrophotographic images involves either the use of liquid toner, a single component "magnetic" toner, or a dual component system using dried toner mixed with a coated toner carrier core. The majority of today's copiers and printers are dual component systems.

When two dissimilar materials are mixed, each receives a static electric charge of equal and opposite polarity. The toner carrier part of the dual component carrier/toner system serves both the purpose of triboelectrically charging the toner and transporting it to the photoreceptor. An advantage of the invention is that the toner can be uniformly charged to one polarity, with alteration in the sign of the charge or its extent possible by changing the chemistry of either toner or carrier. Additionally, the carrier scavenges unwanted toner that otherwise would contribute to a loss in quality through background. To function properly, the carrier must uniformly charge and transport the toner, be non-abrasive to the photoreceptor and have long life. Properties of the carrier which control this behavior include particle size and shape, specific gravity, mass flow, magnetic behavior and wetting and adhesion behavior with respect to carrier coatings if used.

Electric utilities consume hundreds of millions of tons of coal annually in the United States. Due to ever increasing costs of petroleum-based fossil fuels and a national energy policy of reducing dependence on foreign-source fuel such as oil by shifting to coal, electric utilities are now projected to use nearly 800 million tons of coal annually by 1985. Fly ash, the predominant residue of coal burning, has in the past presented disposal problems to users of significant amount of coal. Despite the national focus on resource recovery and recycling during the recent past decades, and the doubling of the percentage of fly ash utilized over the period 1966 to 1978, the year 1978 saw the collection of over 48 million tons of fly ash by electric utilities alone and utilization of only 8 million tons of that total. An estimated 68 million tons of fly ash are annually produced in the United States and the significant and perhaps even dramatic anticipated shift from petroleum to coal in fossil fuel generating stations can be reasonably expected to greatly increase the amount of fly ash collected in the future.

Although to date many coal-fired generating stations have been located near sources of coal where ash disposal problems may be presumed to be minimal, as oil-fired units far removed from coal fields convert to coal under the contemporary pressures of economics and national policies, ash disposal can be expected to develop into an ever-increasing problem which, when coupled when increasingly stringent federal, state and local regulation of landfills, water quality and waste disposal generally, will present significant challenge and expense to such large scale coal users. Of the 8 million tons of fly ash utilized in 1978, almost one-third of that was utilized from disposal sites, i.e., after the producers of the fly ash had already incurred disposal costs.

Of the approximately 8 million tons of fly ash utilized in 1978, about two-thirds of it was used commercially in such applications as concrete products, cement, fill and the like.

In the instant invention raw fly ash is processed to obtain magnetite suitable for use in electrostatic imaging systems.

It is well known to form and develop images on the surface of photoconductive materials by electrostatic methods such as described, for example, in U.S. Pat. Nos. 2,297,691; 2,277,013; 2,551,582; 3,220,324; and 3,220,833. In summary, these processes as described in the aforementioned patents involve the formation of an electrostatic latent charged image on an insulating electrophotographic element and rendering the latent image visible by a development step whereby the charged surface of the photoconductive element is brought into contact with a developer mixture. As described in U.S. Pat. No. 2,297,691, for example, the resulting electrostatic latent image is developed by depositing thereon a finely-divided electroscopic material referred to in the art as toner, the toner being generally attracted to the areas of the layer which retain a charge thus forming a toner image corresponding to the electrostatic latent image. Subsequently, the toner image can be transferred to a support surface such as paper and this transferred image can be permanently affixed to the support surface using a variety of techniques including pressure fixing, heat fixing, solvent fixing, and the like.

Many methods are known for applying the electroscopic particles to the latent image including cascade development, touchdown and magnetic brush as illustrated in U.S. Pat. Nos. 2,618,552; 2,895,847 and 3,245,823. One of the most widely used methods is cascade development wherein the developer material comprising relatively large carrier particles having finely-divided toner particles electrostatically clinging to the surface of the carrier particles is conveyed to and rolled or cascaded across the electrostatic latent image-bearing surface. Magnetic brush development is also known and involved the use of a developer material comprising toner and magnetic carrier particles which are carried by a magnet so that the magnetic field produced by the magnet causes alignment of the magnetic carriers in a brush-like configuration. Subsequently, this brush is brought into contact with the electrostatic latent image-bearing surface causing the toner particles to be attracted from the brush to the electrostatic latent image by electrostatic attraction, as more specifically disclosed in U.S. Pat. No. 2,874,063.

Carrier materials used in the development of electrostatic latent images are described in many patents including, for example, U.S. Pat. No. 3,590,000. The type of carrier material to be used depends on many factors such as the type of development used, the quality of the development desired, the type of photoconductive material employed and the like. Generally, however, the materials used as carrier surfaces or carrier particles or the coating thereon should have a triboelectric value commensurate with the triboelectric value of the toner in order to generate electrostatic adhesion of the toner to the carrier. Carriers should be selected that are not brittle so as to cause flaking of the surface or particle break-up under the forces exerted on the carrier during recycle as such causes undesirable effects and could, for example be transferred to the copy surface thereby reducing the quality of the final image.

U.S. Pat. No. 4,319,988 discloses a process for separation of magnetite from raw fly ash. The magnetite is then used in the cleaning of coal. Magnetite derived from fly ash is basically spherical in nature with the exception of clusters of two or more particles. The object of the invention is to provide a material composed of free spherical particles of the proper density, size, and flowability, and essentially free of material which is not suitably attracted by magnetic forces. This is accomplished by sizing and magnetic and physical separation steps to remove substantially all unsuitable particles. Grinding may be employed in the liberation and separation of clusters.

Numerous patents suggest the use of magnetite in a toner carrier. For example, see U.S. Pat. Nos. 3,565,805, 3,795,618, 2,898,170, 4,076,640, 4,233,387, 4,265,995, 4,287,287 and 4,301,228. In U.S. Pat. No. 4,076,640 a process is described for manufacturing spherizoidized particles having an average saturation magnetic moment of between 50 and 85, and preferably at least 70 electromagnetic units per gram. However, the prior art does not teach or suggest a ferrite toner carrier composition derived from fly ash or a process for making it.

SUMMARY OF THE INVENTION

It is, therefore, an object of the invention to provide a ferrite toner carrier core material made from readily available fly ash.

It is another object of the invention to provide a process for separating magnetite from fly ash which magnetite is suitable for use in a toner-carrier composition.

It is another object of the invention to provide a process for producing magnetic from fly ash in spheroid particles having improved magnetic and electrical properties.

A further object of the invention is to provide a toner carrier core upon which a coating is not necessary.

The above and other objects are accomplished by treating raw fly ash in order to obtain carrier particles suitable for use in electrostatographic imaging systems. The carrier core composition of the instant invention is advantageous over the toner carrier cores of the prior art in that it is made from an inexpensive starting material. It is also of a lower density than existing carrier cores, which results in less machine and particle abrasion, lower toner impaction and less weight per developer charge. Since the toner carrier core is highly spherical, it exhibits an improved flowability, less abrasion and a better image fill. The instant toner carrier core has also an improved lifetime with a high work index of 30 and a high MOH hardness of 7.5. In some instances, it has been found that there is no need to provide a coating for the instant toner carrier core.

More specifically, the invention provides a ferrite toner carrier core material of the general formula

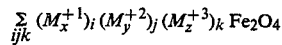

wherein iron is the principal metallic element and
i,j,k denote the number of atoms of monovalent, divalent and trivalent atoms present in one mole of the compound, and $M_x$ denotes monovalent atoms from Group IA of the Periodic Table, the alkali metals, usually sodium or potassium, alone or together.

$M_y$ denotes divalent atoms from Group IIA of the Periodic Table, the alkali earth metals, usually magnesium or calcium, alone or together.

$M_z$ denotes trivalent atoms from Group IVB, usually titanium, Group IVA, usually silicon and Group IIIA, usually aluminum. All permutations and combinations may be present.

The ferrite exhibits a spinel type cubic crystal structure and a cooperative type magnetic behavior. The particle size of the toner carrier ranges from 20 microns to 300 microns. Essentially, all of the particles of the toner carrier are spherical in shape. FIGS. 1 and 2 are scanning electron microscope (SEM) photomicrographs taken at magnifications of approximately 100X and 500X respectively and showing the spherical shape and the very small degree of eccentricity in the sphericity at these magnifications of the particle shapes. The bulk saturation magnetization of the toner carrier core may range from 43–70 emu/g at 6000 gauss with a remanence of 5 emu/g or less. The toner carrier core material exhibits an electrical resistivity ranging from about $10^8$ and $10^{13}$ ohm-cm, an apparent density greater than 1.8 grams per cubic centimeter and a Hall Flow of 20 seconds or more per 50 grams (depending on the size of the particles). In addition, the toner carrier core exhibits a high hardness, being 7.0–8.0 MOH scale, and a strong durability or resistance to breakage as evidenced by a work index of greater than about 30.

The particle size principally depends upon the requirements of the copier in which the toner carrier core is used. Preferably, many current copying machines employ particle size ranges from 63–149 microns or 44–177 microns or 53–125 microns although improvements in machine design are shifting the size consist so as to include finer sizes. In the chemical formula for the ferrite toner carrier core, it is preferred that M include aluminum and that the total content of all such substitutions be less than about 25% by weight of the cations present in the ferrite structure. It has been found that the preferred density is about 2.4 grams per cubic centimeter.

The ferrite toner carrier core may be prepared from a particulate feedstock containing spherical ferrite particles, preferably flyash. It has been found that in order to produce the ferrite toner carrier core having the above properties from flyash, three basic steps are needed: recovery of the magnetic fractions from the non-magnetic fractions, size classification, and purifying. While it is recommended that these steps be carried out in the abovementioned order, such order is not necessary to the practice of the invention.

The separation of non-magnetic fractions from the magnetic fractions (magnetics recovery) may be accomplished by dry magnetic separation, wet magnetic separation, or wet density separation. These methods may be used either alone or in combination with each other. The choice of the method to be used depends largely on the state of the raw flyash which is to be processed and the desired state of the residual flyash to be returned to the supplier. Thus, if the raw flyash is initially in a wet state, then wet magnetic separation or wet density separation would be preferred.

The size classification can be done by dry screening, wet screening, or air separation, each process used alone or in combination with one or more of the others.

The choice of the initial size classification method to be used depends largely on the state of the raw flyash to be processed. Thus, in achieving a desired size classification, if the raw flyash is received dry, dry screening and/or air separation, such as with a centrifugal air classifier, is preferred as the initial size classification treatment, to be followed preferably by wet screening, drying and a combination of dry screening and air separation. In the event the raw flyash is available in a wet state, wet screening would be the initial method of size classification followed by drying and dry screening used alone or in conjunction with air separation.

The purifying stage preferably includes subjecting the products to dry centrifugal/magnetic separation, dry/magnetic separation and dry/density separation.

The use of these methods in accomplishing the purifying stage enables a separation based on the three physical characteristics that principally determine ferrite toner carrier core material quality; particle size, particle specific gravity or density and magnetization. The use of these methods enables these properties to be employed alone or in combination in selectively removing those particles in the admixture of liberated particles which fail to exhibit sufficient magnetization, sufficient density or are not within the desired size range to qualify as product ferrite material. In using the dry magnetic separation method, for example, the feed material is introduced at the top center position of a rotating steel drum within which are mounted, through an arc of approximately 200° beginning at the top center position and sweeping in the direction of drum rotation to a point slightly beyond the bottom center position, permanent magnets with alternating adjacent pole faces such that the magnetic material is held to the drum surface until after it has traversed the magnetic sector, whereupon the loss of magnetic attraction to the permanent magnets within the shell is lost and the force of gravity causes the particles to drop from the surface of the shell. The nonmagnetic material, being influenced only by gravitational forces with no magnetic attraction to the shell falls immediately and, in so doing, provides the desired separation. By adjusting the drum speed the effect of centrifugal force may be incorporated with both that of gravity and magnetic attraction to effect the early release of particles in the feed admixture which fail to exhibit sufficiently strong magnetization in the presence of the permanent magnets to resist the centrifugal forces set up by the revolving drum to cause their being dislodged. The use of dry density separation method in the purifying stage combines the effect of centrifugal and gravitational forces as well as aerodynamic drag in separating lighter (both by density and fineness) particles from those more dense.

The product may be washed by wet screening in the purifying stage and also may optionally be ground, subjected to wet magnetic separation and/or wet density separation.

The methods of wet magnetic separation and wet density separation are analagous in so far as their principle of operation to the dry purifying methods with the exception, of course, that centrifugal forces cannot be employed. In some cases, depending on the raw flyash material and the desired product specifications grinding may be a desired method in achieving the purifying state used in conjunction with any or all of the above described processes. Grinding serves to reduce clusters of spherical particles, weakly joined at the points of contact and containing both ferrite toner carrier core particles possessing the desired properties and others, whether nonmagnetic, weakly magnetic or otherwise unacceptable, by causing the fracture of these relatively weak interparticle bonds without imparting so much energy so as to cause brittle fracture of the spherical ferrite toner carrier core particles.

The process for producing the instant ferrite toner core carrier material requires substantially all of the non-magnetic flyash particles being removed as well as substantially all of the broken and hollow magnetic spheres. In addition, the separation of substantially all of the weak magnetic particles is necessary. The sizing of the purified material is made in accordance with the specifications of the copier in which the toner carrier core is to be used.

DETAILED DESCRIPTION OF THE DRAWINGS

Figure 1:
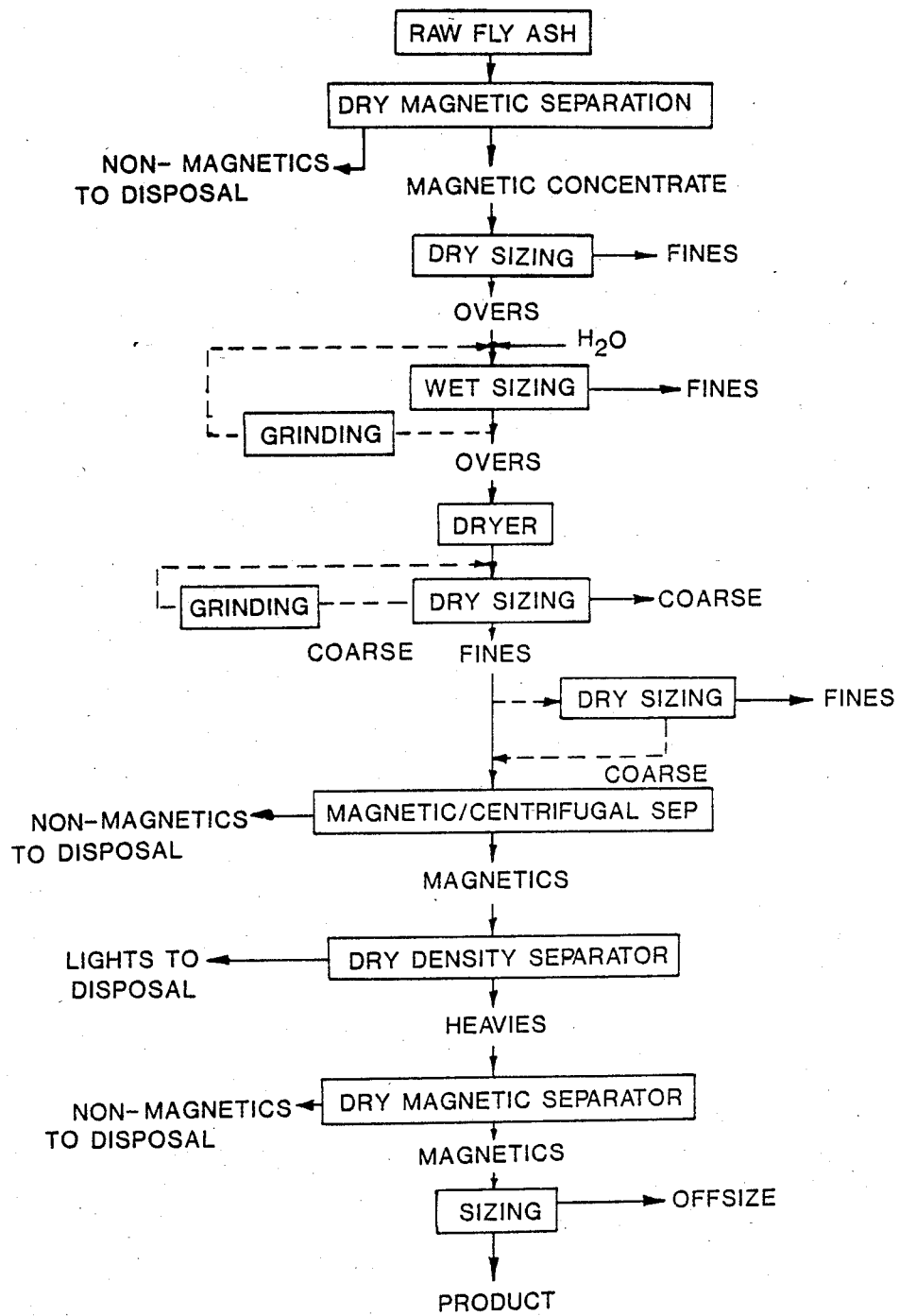
FIG. 1 is a flowchart of the preferred process for producing the ferrite toner carrier core from raw flyash.

In FIG. 1 it is shown that raw flyash is subjected to dry magnetic separation to recover the magnetic fraction. The magnetic concentrate is then subjected to dry sizing, eliminating most particles under 44 microns and continuing the processing with the particles over 44 microns. Said particles are washed in water and wet sized, resulting in the discarding of particles under 44 microns and continuing the processing of the particles over 44 microns. These particles may be optionally subjected to grinding and rewashed and rewet sized. These particles are then dried and dry sized with the particles over 177 microns being either disposed or ground and resubjected to dry sizing.

The particles under 177 microns and over 44 microns may optionally be subjected to a further dry sizing. The resulting sized material is subjected to a dry centrifugal/magnetic separator separating out most of the particles with insufficient magnetization. The particles are then subjected to a dry density separator with the lighter particles being rejected. The heavier particles are then subjected to a dry gravity/magnetic separator where essentially all the remaining particles with insufficient magnetization are removed.

It should be noted that the order of the centrifugal/magnetic separation, gravity/magnetic separation, and dry density separation is not essential and may be conducted in any order. After these processes have been completed a further sizing may be made in order to result in a final product of the particle size required by the application in which the toner carrier core is to be used.

Figure 2:
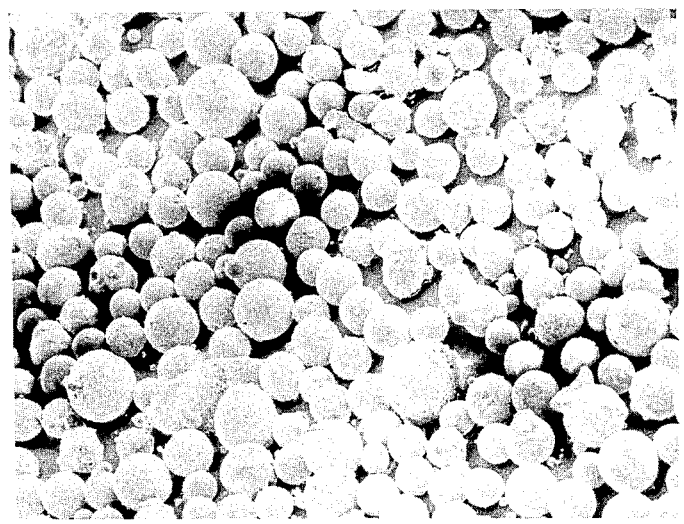
FIG. 2 is a scanning electron microscope (SEM) photomicrograph of ferrite at a magnification of 100X.
Figure 3:
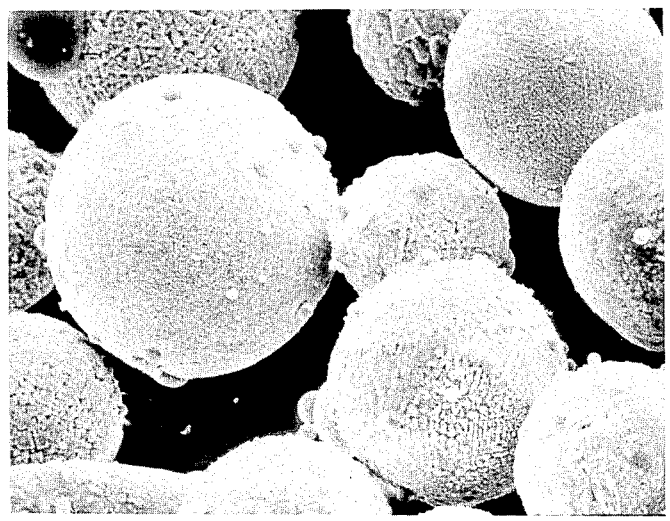
FIG. 3 is a scanning electron microscope (SEM) photomicrograph of ferrite at a magnification of 500X.

In FIGS. 2 and 3, actual pictures are shown of the toner carrier core according to the invention, in order to fairly illustrate the spheroid particles of the ferrite toner carrier core of the instant invention.

The magnetite produced in accordance with the invention may be coated with any suitable coating material. Typical electrostatographic carrier particle coating materials include vinyl chloridevinyl acetate copolymers, poly-p-xylylene polymers, styreneacrylate-organosilicon terpolymers, natural resins such as caoutchouc, colophony, copal, dammar, Dragon's Blood, jalap, storax; thermoplastic resins including the polyolefins such as polyethylene, polypropylene, chlorinated polyethylene, and chlorosulfonated polyethylene; polyvinyls and polyvinylidenes such as polystyrene, polymethylstyrene, polymethyl methacrylate, polyacrylonitrile, polyvinyl acetate, polyvinyl alcohol, polyvinyl butyral, polyvinyl chloride, polyvinyl carbazole, polyvinyl ethers, and polyvinyl ketones; fluorocarbons such as polytetrafluoroethylene, polyvinyl fluoride, polyvinylidene fluoride, and polychlorotrifluoroethylene; polyamides such as polycaprolactam and polyhexamethylene adipamide; polyesters such as polyethylene terephthalate; polyurethanes; polysulfides, polycarbonate; thermosetting resins including phenolic resins such as phenol-formaldehyde, phenolfufural and resorcinol formaldehyde; amino resins such as urea-formaldehyde and melamineformaldehyde; polyester resins; epoxy resins; and the like.

Many of the foregoing and other typical carrier coating materials are described by L. E. Walkup in U.S. Pat. No. 2,618,551; B. B. Jacknow et al U.S. Pat. No. 3,526,533; and R. J. Hagenbach et al in U.S. Pat. Nos. 3,533835 and 3,658,500. When the magnetic carrier particles of this invention are coated, any suitable electrostatographic carrier coating thickness may be employed. However, a carrier coating having a thickness at least sufficient to form a thin continuous film on the carrier particle is preferred because the carrier coating will then possess sufficient thickness to resist abrasion and prevent pinholes which adversely affect the triboelectric properties of the coated carrier particles. Generally, for cascade and magnetic brush development, the carrier coating may comprise from about 0.1 percent to about 10.0 percent by weight based on the weight of the coated composite carrier particles. Preferably, the carrier coating should comprise from about 0.1 percent to about 1.0 percent by weight based on the weight of the coated carrier particles because maximum durability, toner impaction resistance, and copy quality are achieved. To achieve further variation in the properties of the coated magnetic carrier particles, well known additives such as plasticizers, reactive and non-reactive polymers, dyes, pigments, wetting agents and mixtures thereof may be mixed with the coating materials. An ultimate coated or uncoated carrier particle having an average diameter between about 30 microns and about 600 microns is preferred in development systems because the carrier particle then possesses sufficient density and inertia to avoid adherence to the electrostatic image during the development process. Adherence of carrier particles to an electrostatographic drum is undesirable because of the formation of deep scratches on the drum surface during the image transfer and drum cleaning steps, particularly where cleaning is accomplished by a web cleaner such as the web disclosed by w. P. Graff, Jr., et al in U.S. Pat. No. 3,186,838.

Any suitable well-known toner material may be employed with the magnetic carriers of this invention. Typical toner materials include gum copal, gum sandarac, rosin, coumarone-indene resin, asphaltum, gilsonite, phenolformaldehyde resins, rosin modified phenolformaldehyde resins, methacrylic resins, polystyrene resins, polypropylene resins, epoxy resins, polyethylene resins, polyester resins, and mixtures thereof. The particular toner material to be employed obviously depends upon the separation of the toner particles from the magnetic carrier in the triboelectric series and should be sufficient to cause the toner particles to electrostatically cling to the carrier surface. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. Reissue No. 25,136 to Carlson and U.S. Pat. No. 2,788,288 to Rheinfrank et al. These toners generally have an average particle diameter between about 1 and 30 microns.

Any suitable colorant such as a pigment or dye may be employed to color the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Ozalate, lampblack, Rose Bengal, Monastral Red, Sudan Black BM, and mixtures thereof. The pigment or dye should be present in the toner in a quantity sufficient to render it highly colored so that it will form a clearly visible image on a recording member. Preferably, the pigment is employed in an amount from about 3 percent to about 20 percent, by weight, based on the total weight of the colored toner because high quality images are obtained. If the toner colorant employed is a dye, substantially smaller toner concentration may be employed with the magnetic carriers of this invention. Typical toner concentrations for electrostatographic development systems include about 1 part toner with about 10 to about 200 parts by weight of carrier.

Any suitable organic or inorganic photoconductive material may be employed as the recording surface with the magnetic carriers of this invention. Typical inorganic photoconductor materials include: sulfur, selenium, zinc, sulfide, zinc oxide, zinc cadmium sulfide, zinc magnesium oxide, cadmium selenide, zinc silicate, calcium strontium sulfide, cadmium sulfide, mercuric iodide, mercuric oxide, mercuric sulfide, indium trisulfide, gallium selenide, arsenic disulfide, arsenic trisulfide, arsenic triselenide, antimony trisulfide, cadmium sulfo-selenide and mixtures thereof. Typical organic photoconductors include: quinacridone pigments, phthalocyanine pigments, triphenylamine, 2,4-bis(4,4'-diethyl-amino-phenol)-1,3,4-oxadiazol, N-isopropylcarbazol, triphenyl-pyrrol, 4,5-diphenylimidazolidinone, 4,5-diphenylimidazolidinethione, 4,5-bis(4'-aminophenyl)-imidazolidinone, 1,5-dicyanonaphthalene, 1,4-dicyanonaphthalene, aminophthalodinitrile, nitrophthalodinitrile, 1,2,5,6-tetraazacyclooctatetraene (2,4,6,8), 2-mercaptobenzothiazole-2-phenyl-4-diphenylideneoxazoione, 6-hydroxy-2,3-di(p-methoxyphenyl)-benzofurane, 4-dimethylamino-benzylidene-benzhydrazide, 3-benzylidene-aminocarbazole, polyvinyl carbazole, (2-nitro-benzylidene)-p-bromoaniline, 2,4-diphenyl-quinazoline, 1,2,4-triazine, 1,5-diphenyl-3-methyl-pyrazoline, 2-(4'-dimethylamino phenyl)-benzoxazole, 3-amine-carbazole, and mixtures thereof. Representative patents include U.S. Pat. Nos. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

It is believed that the spheroid particles of magnetite produced in the invention possess macroscopically smooth outer surfaces which are highly resistant to cracking, chipping and flaking. In electrostatographic development systems, the spherical surface enhances the tribo-electric action of the carrier particles across the electrostatic surfaces and reduces the tendency of carrier particles to adhere to electrostatographic imaging surfaces. When these carriers are employed in electrostatographic development systems, carrier life is unexpectedly extended, particularly with respect to toner impaction resistance. It is believed that the carriers of the invention provide more uniform tribo-electric characteristics, greater toner latitude, more rapid charging, lower remanence, lower density and more uniformly spherical particles than carriers using magnetite not derived from fly ash. Thus the magnetic carrier particles of this invention have desirable properties which permit their wide use in presently available electrostatographic systems.

The following examples further define and describe the process and the product of the invention.

EXAMPLE I

Raw fly ash produced in a pulverized coal-fired utility boiler is fed to a permanent magnet drum separator, with a magnetic field intensity of 1000 gauss, at 4 TPH/ft. of drum width. The middling and nonmagnetic fractions are collected and discarded. The magnetic fraction representing approximately 20% of the feed is mixed with water in a slurry mixing tank. The solids are adjusted to approximately 15% by weight and fed to a 1000 gauss wet drum separator at a rate of 60 GPM/ft. of drum width. The nonmagnetic fraction comprising about 50% of the solids is discarded. The magnetic fraction is collected for further size classification and purification.

EXAMPLE II

A sample of magnetic material from the process of Example I following the initial wet magnetic separation stage is obtained and dried to obtain about 20 pounds. This material is hand-screened to obtain two size fractions; 100 mesh by 200 mesh and 200 mesh by 325 mesh, the oversize and undersize are discarded. These two size fractions are processed on a commercially available laboratory size high tension separator. The separator consists of a 15 inch diameter drum revolving at 90 RPM and a wire type electrode. During the first pass the electrode is at 10 KVolt potential and the material is fed at 10 pounds per hour per inch of drum width. The material collected as conductors is repassed a second and third time with an electrode potential at 40 KV. The conductors from the final pass represent about 30% of the original feed to the separator and are essentially free of non-conductors.

EXAMPLE III

About 2,000 pounds of material from Example I is wet size classified on a 48 inch circular screen to produce a size consist of 120 mesh by 250 mesh. This material is then dried and ground in a laboratory tube mill. This ground material is made into a slurry with water and cleaned of non-magnetic material with a wet magnetic separator. The magnetic material is dried again and sized again on a 48 inch screen to produce a size consist of 120 mesh by 250 mesh. This resulting material represents about 110 pounds.

This material is then cleaned with a commercially available laboratory model high tension separator. This separator consists of a 10 inch diameter drum and two high tension electrodes. The material is fed at 50 pounds per hour per inch of drum width for the first pass at about 300° F. The drum revolves at 52 RPM and the two wire electrodes are at a potential of 29 KV. About 80% of the feed reports to the conductor fraction.

The conductor fraction is passed a second time at about 300° F. through the separator. The drum speed is 85 RPM, the feed rate is 40 pounds per hour per inch and a wire and a plate electrode are used both at a potential of 21 KV. About 60% of the original feed reports to the conductor fraction.

The conductor fraction is passed a third time through the separator at about 300° F. The drum speed and electrode potentials are the same as for the second pass. The feed is at 30 pounds per hour per inch. About 52% of the original feed to the separator reports to the conductor fraction of the third pass.

This magnetic and electrostatically conducting material, about 55 pounds, is then dry size classified on a 48 inch diameter screen to produce a size consist of 120 mesh by 250 mesh, the resulting product weighing about 50 pounds.

EXAMPLE IV

About 29,000 pounds of fly ash is subjected to a dry magnetic separation on a high speed, permanent magnet dry drum separator at 500 FPM, 4 TPH/FT and 1,000 gauss field intensity and magnetic and middling fractions are collected about 4300 pounds and collected and slurried to about 25 percent solids in water and fed to a 6 inch cyclone at about 15 psi pressure. The underflow from the cyclone, about 3,000 pounds of solids, is wet size classified on a 48 inch circular screen to produce a size consisting of 120 mesh by 250 mesh particles. This material is then dried and lightly ground in a 3 foot diameter pebble mill. This ground material, representing about 900 pounds, is fed to a high speed dry magnetic drum separator at 1700 FPM, 0.5 TPH/FT and 1,000 gauss field intensity. The magnetic fraction, about 700 pounds, is collected and dry size classified on a 48 inch circular screen to produce a size consisting of 120 mesh by 250 mesh particles. A sample of this material, representing 850 grams was mixed with about 15 grams of Aunyx 3100 toner to form a developer. This developer was tested in a Xerox 3100 LDC ™ copier for over 18,000 copies. All the copies were of excellent quality; good density and resolution with no background. Comparative tests were run with Xerox standard developer annd a ferrite, D.M. Steward CB 110. The toner carrier of this example was superior to the two other products in producing copies with better density and smoother solid fill.

EXAMPLE V

Approximately 2,000 pounds of fly ash from a power plant was magnetically separated using a commercially available dry drum type magnetic separator. 450 pounds of product was obtained with a magnetic content of about 55%. This material was wet screened and washed at 250 mesh on a 48 inch diameter circular screening machine, the undersize being discarded. The +250 mesh product, about 70 pounds, was dried in an electric oven. The dried material was hand screened at 100 mesh, with the oversize being discarded. The remaining 68 pounds was separated on a magnetic vs. gravity separator, with 4 pounds being discarded as non-magnetic. The 64 pounds was separated using a high speed drum type magnetic separator with about 16 pounds remaining as product. this product was repassed on the magnetic vs. gravity separator with very little loss to non-magnetics. This resulting material has an apparent density of 2.15 grams per cubic centimeter and a specific gravity of 4.2.

The standard developer was removed from a Xerox 3107 copier and amounted to 1570 grams or 360 cubic centimeters. An equal volume of toner carrier cores, as produced above, which weighed only 900 grams is mixed with 1.7% of Xerox 3100 Dry Imager and added to the 3107 copier. The copies produced were equivalent to those made with the standard developer, with no bead carryover.

EXAMPLE VI

Fly ash from another power plant was passed through a drum type dry magnetic separator to produce a magnetic concentrate, the non-magnetic portion being discarded. Water was added to this concentrate and the resulting slurry was passed through a hydraulic cyclone to effect a separation by size and density. The heavier and coarser fraction was then passed over a stationary slotted screen for further fines removal. The coarse product of this screen went next to a 48 inch diameter circular screen at 250 mesh for final fines removal and washing. The coarse product of this screen was dried in an electric oven and dry screened at 100 mesh to remove the oversize particles. The resulting product was essentially 100×250 mesh. It was next processed by a high speed drum type magnetic separator, the non-magnetic portion being discarded. The magnetic portion had a final magnetic purification with a magnetic vs. gravity separator. 900 grams of this material was mixed with 15 grams of Xerox 3100 Dry Imager and placed in a Xerox 3107 copier. Copy quality was good with no bead carry over.

EXAMPLE VII 2100 g product produced by Example III was heated to 150° F. and cooled to 125° F. 126 g of a coating solution, methyl methacrylate/styrene/vinyl triethoxy silane, at 25% solids in toluene, was diluted to 380 ml with methylene chloride. The carrier core and diluted coating solution were placed in a T-33 vibratub and a heat lamp used to evaporate the solvent and then heat to 120° F. for a total time of 45 minutes. After cooling to room temperature the coated carrier core was screened 15 minutes using a Ro-Tap and 120, 170, 230, 325 mesh sieves. The 120×325 mesh size fraction weighing 950 g was blended 2 minutes with 19 g Xerox toner and a charge placed in a Xerox 3100 copier. During a copy test a few beads carried over with the first copy, thereafter no beads were seen and copy quality was excellent.

EXAMPLE VIII 950 g of carrier core product produced by Example III was blended, without coating, with 19 g Xerox 3100 Toner. During a copy test a few beads were found wtih the first copy, thereafter none. Copy quality was excellent, with solids black and sharp, superior to the coated example VII.

EXAMPLE IX

Raw fly ash in the dry state is passed over a permanent magnet drum separator at a rate of approximately 40 TPH. The magnetic fraction, with a magnetics content as determined by the Davis Tube method of about 70% and representing nominally 20% by weight of the raw flyash starting material is wet screened at 250 mesh using a 48 inch diameter vibrating screen. The oversized material is dried and dry screened using an 18"×72" vibrating screen at 100 mesh. The undersized material, essentially 100×250 mesh fed, at a rate of 2000 lb/hr. to a dry centrifugal/magnetic separator and produces a magnetic concentrate of 2.25 apparent density, with a size distribution of 3.2% plus 100 mesh, 78.5% 100×230 mesh, 15.1% 230×325 mesh, and 3.2% minus 325 mesh on a weight basis. This magnetic fraction is passed through a dry density separator (air separator) at a rate of 1000 lb/hr. and reduces the minus 325 mesh size fraction to 1.6% and the 230×325 mesh fraction to 9.1%, while raising the apparent density to 2.34. The material recovered in this way is fed to a dry magnetic separator and the magnetic concentrate repassed to produce a ferrite toner carrier core material with 2.5% plus 100 mesh, 86.1% 100×230 mesh, 9.8% 230×325 mesh, and 1.6% minus 325 mesh. The apparent density is 2.30. A sample of this material representing about 850 g is mixed with approximately 15 g of Aunyx 3100 toner to form a developer. This developer was tested in a Xerox 3100 TM copier for 20,000 copies.

All the copies were of acceptable quality, excellent density and resolution with no background from the initial copies. No toner throw-off was observed around the developer section; corotrons and transport belts were very clean throughout the test. Toner waste was found to be 190.6 g or 0.95 g/100 copies. No machine damage was found to have occurred and, particularly, no scratching of the photoreceptor drum was detected. Toner yield was determined to be 16,000 copies/lb or toner. Charge to mass was 14.0 microcoulombs/g initially, 16 microcoulombs/g after 10,000 copies and 19.0 microcoulombs/g after 20,000 copies. Comparative tests were conducted with Xerox Developer and Toner. The toner carrier in this example was superior to the other product in maintaining machine cleanliness, and toner waste as evidenced by a toner waste of 222 g or 1.11 g/100 copies for the case involving the Xerox product. Toner yield for the Xerox product was comparable and within machine variation at 16,800 copies/lb of toner. Some bead carry out was observed initially for the Xerox case whereas none was observed when using the toner carrier in this example. Charge to mass was somewhat less stable for the Xerox material, ranging from 15.4 microcoulombs/g after 8500 copies to 14.0 microcoulombs/g after 20,000 copies.

What is claimed is:

1. A toner carrier composition comprising a ferrite toner carrier core composition derived from fly ash which is a mixture of spherical particulates of the general formula

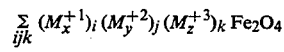

$$\sum_{ijk} (M_x^{+1})_i (M_y^{+2})_j (M_z^{+3})_k Fe_2O_4$$

wherein iron is the principal metallic element and
  i,j,k denote the number of atoms of monovalent, divalent and trivalent atoms present in one mole of the compound, and
  $M_x$ denotes monovalent atoms from Group IA of the Periodic Table,
  $M_y$ denotes divalent atoms from Group IIA of the Periodic Table,
  $M_z$ denotes trivalent atoms from Group IVB, Group IVA or Group IIIA;
wherein the particle size of the particulate is from 20 to 300 microns and the composition has an average saturation magnetization of 43 to 70 emu/g, an apparent density of 1.8 g/cm³ or greater, a hardness of 7-8.0 Moh scale, and a resistivity of $10^8$–$10^{13}$ ohm-cm. 0.1% to 2.0% by weight of an electrostatic carrier particle coating material.

2. A toner carrier composition of claim 1 further comprising a colorant to color said spherical particulates.

3. A ferrite toner carrier core composition derived from fly ash comprising a mixture of spherical particulates of the general formula $$\sum_{ijk} (M_x^{+1})_i (M_y^{+2})_j (M_z^{+3})_k \, Fe_2O_4$$

wherein iron is the principal metallic element and
i,j,k denote the number of atoms of monovalent, divalent and trivalent atoms present in one mole of the compound, and
$M_x$ denotes monovalent atoms from Group IA of the Periodic Table,
$M_y$ denotes divalent atoms from Group IIA of the Periodic Table,
$M_z$ denotes trivalent atoms from Group IVB, Group IVA or Group IIIA;
wherein the particle size of the particulate is from 20 to 300 microns and the composition has an average saturation magnetization of 43 to 70 emu/g, an apparent density of 1.8 g/cm³ or greater, a hardness of 7-8.0 Moh scale, and a resistivity of $10^8$–$10^{13}$ ohm-cm.

4. The composition of claim 3 wherein $M_x$ is sodium, potassium or a combination thereof, $M_y$ is magnesium or calcium or a combination thereof, and $M_z$ is titanium, silicon, or aluminum or a combination thereof.

5. The composition of claim 4 wherrein $M_z$ includes aluminum and the total content of all substitutions is less than about 25% by weight of the cations present in the ferrite structure.

6. The composition of claim 3 wherein the remanence is 5 emu/g or less.

7. A developer composition which comprises a ferrite toner carrier core composition derived from fly ash which is a mixture of spherical particulates of the general formula $$\sum_{ijk} (M_x^{+1})_i (M_y^{+2})_j (M_z^{+3})_k \, Fe_2O_4$$

wherein iron is the principal metallic element and
i,j,k denote the number of atoms of monovalent, divalent and trivalent atoms present in one mole of the compound, and
$M_x$ denotes monovalent atoms from Group IA of the Periodic Table,
$M_y$ denotes divalent atoms from Group IIA of the Periodic Table,
$M_z$ denotes trivalent atoms from Group IVB, Group IVA or Group IIIA;
wherein the particle size of the particulate is from 20 to 300 microns and the composition has an average saturation magnetization of 43 to 70 emu/g, an apparent density of 1.8 g/cm³ or greater, a hardness of 7-8.0 Moh scale, and a resistivity of $10^8$–$10^{13}$ ohm-cm having coated thereon a toner which electrostatically clings to the surface of said carrier.

8. The developer composition of claim 7 wherein the toner has an average particle diameter of from 1 to 30 microns and wherein there is present one part of toner for each 10 to 200 parts by weight of said carrier.

9. The developer composition of claim 7 wherein the toner particles are colored with a pigment or a dye.

10. The developer composition of claim 9 wherein there is present from 3 to 20 wt. % of the dye or pigment based on the total weight of the colored toner.

11. A composition of claim 3 exhibiting a Hall Flow of 20 seconds or more per 50 grams.

12. A composition of claim 6 having a coercivity of 20 to 60 oersteds.

* * * * *

UNITED STATES PATENT AND TRADEMARK OFFICE
CERTIFICATE OF CORRECTION

PATENT NO. : 4,592,988
DATED : June 3, 1986
INVENTOR(S) : Robert G. Aldrich; Geoffrey H. Earl & David W. Trunko It is certified that error appears in the above-identified patent and that said Letters Patent is hereby corrected as shown below:

Column 13, Line 3, Claim 1, after "ohm-cm" delete "." and insert --and from--.

Column 13, Line 38, Claim 5, change "wherrein" to --wherein--.
Column 14, Line 39, Claim 12, change "6" to --11--.

Signed and Sealed this

Twenty-sixth Day of August 1986

[SEAL]

Attest:

DONALD J. QUIGG

Attesting Officer

Commissioner of Patents and Trademarks